Oct. 18, 1927.                                        1,645,601
                      H. B. LEE
              VELOCITY REDUCING VALVE
               Filed Oct. 26, 1926         2 Sheets-Sheet 2

Inventor
Henry B. Lee
Symour Earle + Nichols
attys

Patented Oct. 18, 1927.

1,645,601

UNITED STATES PATENT OFFICE.

HENRY B. LEE, OF NEW LONDON, CONNECTICUT.

VELOCITY-REDUCING VALVE.

Application filed October 26, 1926. Serial No. 144,262. REISSUED

This invention relates to an improvement in valves and particularly to valves for controlling the flow of elastic fluids, such as steam, though not so limited.

Generally, as heretofore constructed, valves have not only been extremely noisy when employed for controlling high-pressure fluids, but have also been subject to the rapid and destructive erosion of their valve-seats, owing to the high velocity at which such high-pressure fluids tend to flow through a restricted opening.

The object of this invention is to produce a valve which shall be substantially proof against erosion.

A further object is to produce a valve which shall function with the minimum of noise.

With these objects in view, my invention consists in a velocity-reducing valve characterized by its provision with a male member and a co-acting female member constructed and arranged so as to form between them a flow-passage having a progressively-increasing area of flow from its inlet-end to its outlet-end; one of the said members being formed with a series of alternate flanges and expansion-chambers and one of the said members being movable with respect to its co-acting member, whereby the passage past each flange may be coincidentally varied and the velocity of the fluid reduced as a result of the progressive reduction of pressure.

Figure 1:
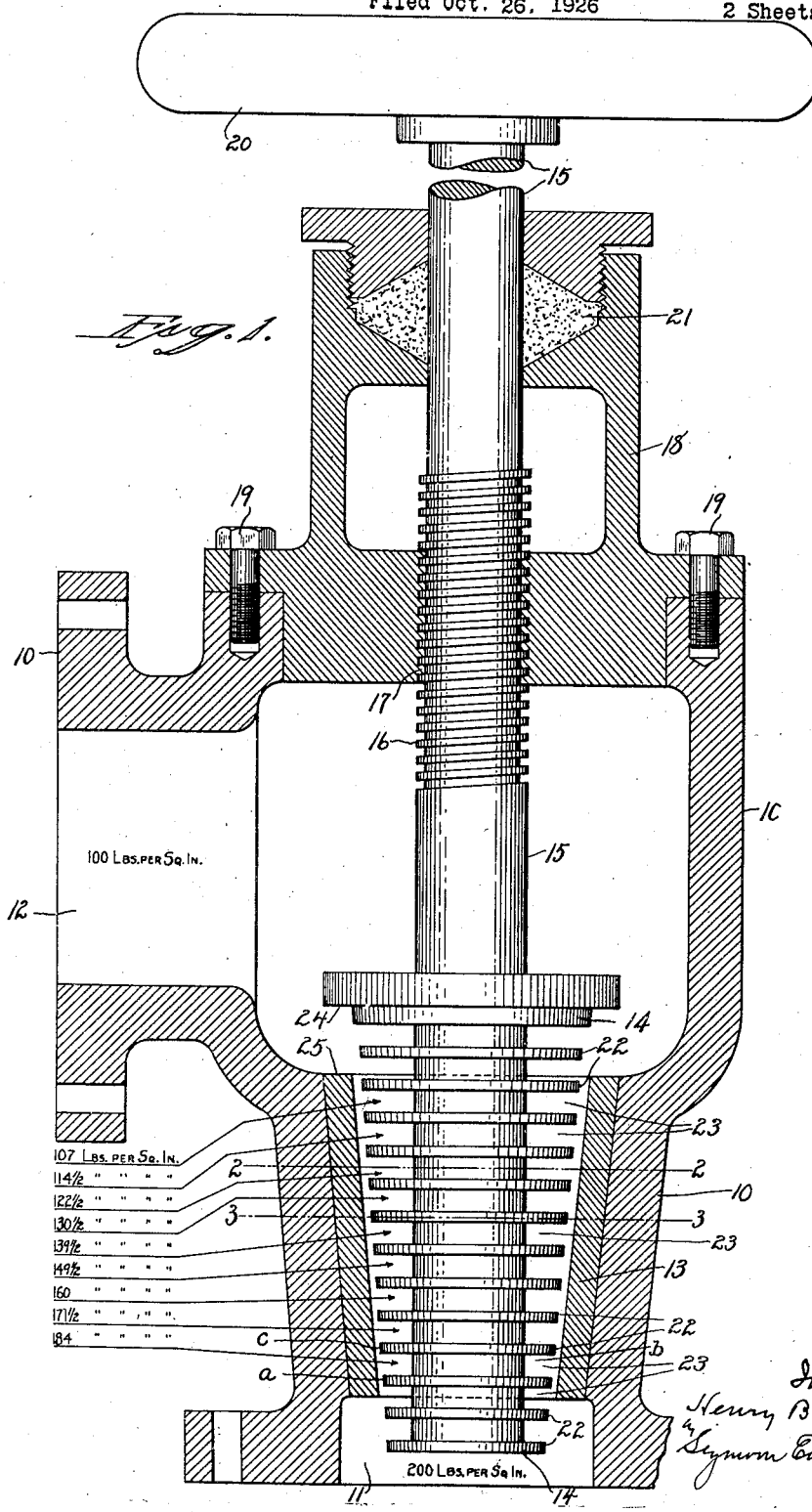
Fig. 1 is a central longitudinal sectional view of a velocity-reducing valve constructed in accordance with my invention.
Figure 2:
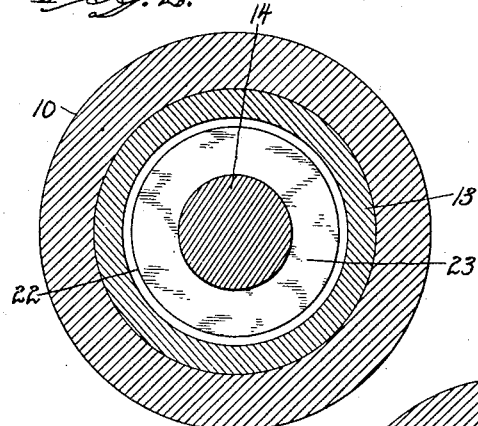
Fig. 2 is a transverse sectional view on the line 2—2 of Fig. 1.
Figure 3:
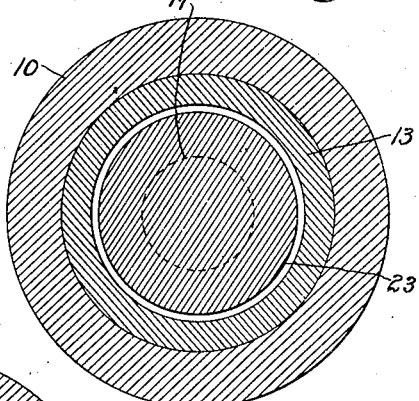
Fig. 3 is a transverse sectional view on the line 3—3 of Fig. 1.

In carrying out my invention, as shown in Figs. 1 to 3 inclusive, I employ a valve-casing 10 having an inlet-port 11 and an outlet-port 12. Axially in line with the inlet-port and in the lower end of the casing 10, I mount a conical tube-like female member or thimble 13 having a smooth interior wall and adapted to receive an axially adjustable conical male member 14. For the purpose of axially adjusting the closure with respect to the thimble 13, the same is mounted upon the lower end of a valve-stem 15, which is formed with external threads 16 engaging corresponding internal threads 17 formed in a cap-member 18, which latter, as shown, is secured to the upper end of the valve-casing 10 by means of bolts 19. The valve-stem 15 aforesaid is provided at its upper end with a hand-wheel 20 and extends through a packing-gland 21 in the cap-member 18.

For stepping down the velocity of the steam or other fluid flowing between the inlet-port 11 and the outlet-port 12, the conical member 14 above described is formed with a series of regularly-alternating annular flanges 22 and annular expansion-chambers 23. A sealing-flange 24 at the upper end of the conical member 14 is adapted to co-act with the upper end 25 of the thimble 13, when it is desired to completely stop the flow of steam through the valve.

Figure 5:
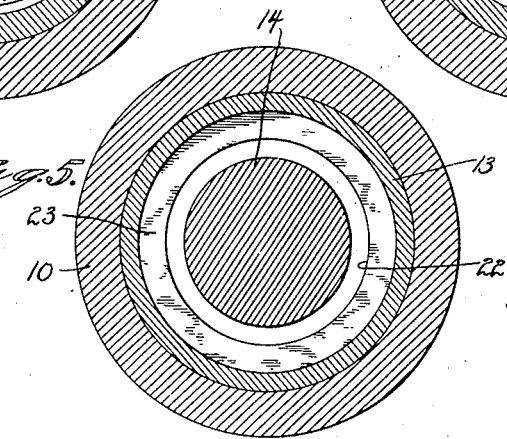
Fig. 5 is a tranverse sectional view on the line 5—5 of Fig. 4.
Figure 4:
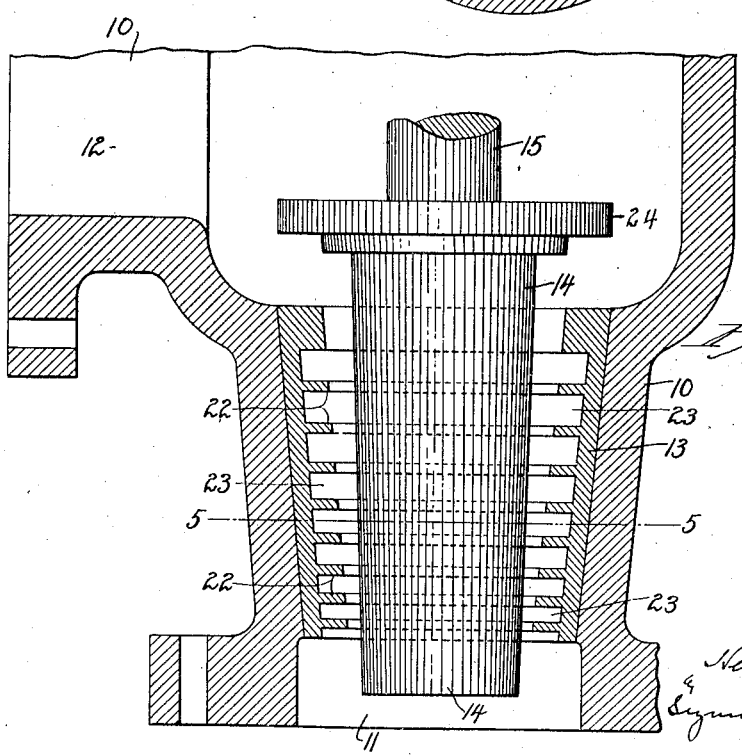
Fig. 4 is a broken central longitudinal sectional view of a modified form which my invention may assume.

Instead of forming the flanges 22 and expansion-chambers 23 upon the male member 14, it is obvious that they may be formed upon the inner face of the female member or thimble, as clearly shown in Figs. 4 and 5.

According to the well-known laws governing the flow of steam, its velocity through an orifice adjusted to reduce its pressure from 200 lbs. per square inch to 100 lbs. per squre inch would be approximately at the rate of 1,675 feet per second, which would be the velocity of the steam flowing between the inlet 11 and outlet 12, were it not for the interposition of the flanges 22 and expansion-chambers 23, as described. Steam flowing at such a velocity as this would not only cause excessive noise, but would also cause the rapid erosion of the walls of the orifice. By my invention, since velocity is dependent upon pressure, the stepping down of the velocity is effected by reducing the pressure progressively, instead of in one step, as has generally been the practice. Since the difference in pressure between two points determine the velocity of flow between them, it follows, therefore, that a relatively slight reduction in pressure results in but slight velocity.

Presuming, for the purpose of description, that a steam pressure of 200 lbs. per square inch exists in the inlet-port 11 and that the male member 14 has been properly proportioned and adjusted with respect to the female member 13, so as to permit sufficient steam to pass to maintain a pressure of 100 lbs. per square inch in the outlet-port 12, the functioning of my improved velocity-reducing valve may be described as follows:

The flanges 22, appropriately proportioned will act as follows:

The flange "a," in conjunction with the adjacent wall of the female member 13, will step the pressure down from 200 lbs. to 184 lbs. by the time it reaches the expansion-chamber "b" and will, therefore, only have been exposed to the action of steam moving at the relatively-low velocity of 570 feet per second. The flange "c" will serve to step the pressure down from 184 lbs. to 171½ lbs. and would, also, be subjected only to the action of steam moving at the rate of 570 feet per second. This step-by-step reduction in pressure will be continued by the successive flanges, as indicated in Fig. 1 of the drawings, until, by the time the steam reaches the outlet-port 12, it will have been reduced to 100 lbs. per square inch. This reduction in pressure from 200 to 100 lbs. will thus have been accomplished without having subjected any part of the valve to the action of steam moving at any greater velocity than 570 feet per second as compared with 1,675 feet per second, which would have been the velocity, were it not for the interposition of the flanges 22 and chambers 23, with the result that erosion is avoided and silent action obtained.

Now, since it follows that as the pressure is reduced, the volume of the steam is increased, the taper of the male member is, as shown, purposely made less than the taper of the female member, so that a progressively greater flow-area is provided by each successive flange from the inlet-end to the outlet-end.

While I have described and indicated in the drawings a proportioning of parts which will cause the steam to flow past each of the several flanges at a correspondng velocity (570 feet per second), I wish to have it understood that this particular proportioning is not essential to my inventon. It is obvious that the velocity of the steam blowing past one flange may be more or less than that flowing past a neighboring flange, provided, however, that the male and female members are proportioned to effect a reduction of the velocity by progressively reducing the pressure.

I claim:

1. A velocity-reducing valve comprising complementary male and female valve members constructed and arranged to form between them a progressively-increasing flow-passage having a relatively greater flow-area at its outlet-end than at its inlet-end, a plurality of alternating flanges and expansion-chambers formed upon one of the said members, and means for adjusting the co-acting relationship between the said members for coincidentally varying the constructing action of the said flanges.

2. A velocity-reducing valve comprising complementary male and female valve members constructed and arranged to form between them a progressively-increasing flow-passage having a relatively greater flow-area at its outlet-end than at its inlet-end, a plurality of alternating flanges and expansion-chambers formed upon the said male member, and means for adjusting the co-acting relationship between the said members for coincidentally varying the constricting action of the said flanges.

3. A velocity-reducing valve comprising a male valve member and a complementary tapered female valve member adapted to receive and co-act with the said male valve member, the said male and female valve members being constructed and arranged to form between them a progressively-increasing flow-passage, a plurality of alternating flanges and expansion-chambers formed upon one of the said members, and means for adjusting the co-acting relationship between the said members for coincidentally varying the constricting action of the said flanges.

In testimony whereof, I have signed this specification.

HENRY B. LEE.